United States Patent [19]

Sanetra

[11] Patent Number: 5,353,010

[45] Date of Patent: Oct. 4, 1994

[54] DEVICE AND A METHOD FOR DETECTING A MAGNETIZABLE MARKER ELEMENT

[75] Inventor: Juergen Sanetra, Ochtrup, Fed. Rep. of Germany

[73] Assignee: Minnesota Mining and Manufacturing Company, St. Paul, Minn.

[21] Appl. No.: 990,442

[22] Filed: Dec. 15, 1992

[30] Foreign Application Priority Data

Jan. 3, 1992 [DE] Fed. Rep. of Germany ....... 4200082

[51] Int. Cl.$^5$ .............................................. G08B 13/24
[52] U.S. Cl. ..................................... 340/572; 340/551
[58] Field of Search ................... 340/572, 551, 825.63, 340/825.64

[56] References Cited

U.S. PATENT DOCUMENTS

| | | | |
|---|---|---|---|
| 3,838,409 | 9/1974 | Minasy et al. | 340/572 |
| 3,863,244 | 1/1975 | Lichtblau | 340/572 |
| 3,961,322 | 6/1976 | Lichtblau | 340/572 |
| 4,118,693 | 10/1978 | Novikoff | 340/572 |
| 4,153,183 | 5/1979 | Chatman | 222/185 |
| 4,243,980 | 1/1981 | Lichtblau | 340/572 |
| 4,281,321 | 7/1981 | Narlow et al. | 340/572 |
| 4,321,586 | 3/1982 | Cooper et al. | 340/572 |
| 4,384,281 | 5/1983 | Cooper | 340/572 |
| 4,527,152 | 7/1985 | Scarr et al. | 340/572 |
| 4,539,558 | 9/1985 | Fearon | 340/572 |
| 4,622,542 | 11/1986 | Weaver | 340/572 |
| 4,642,640 | 2/1987 | Wooley et al. | 342/42 |
| 4,663,612 | 5/1987 | Mejia et al. | 340/572 |
| 4,686,154 | 8/1987 | Mejia | 428/611 |
| 4,704,602 | 11/1987 | Asbrink | 340/551 |
| 4,791,412 | 12/1988 | Brooks | 340/572 |
| 4,859,991 | 8/1989 | Watkins et al. | 340/572 |
| 4,888,579 | 12/1989 | ReMine et al. | 340/572 |
| 5,051,727 | 9/1991 | Fockens | 340/572 |

FOREIGN PATENT DOCUMENTS

2709522 2/1980 Fed. Rep. of Germany .

*Primary Examiner*—Thomas Mullen
*Attorney, Agent, or Firm*—Gary L. Griswold; Walter N. Kirn; Kari H. Bartingale

[57] ABSTRACT

To detect a marker element, a transmitter generates an alternating magnetic field. A receiver arranged in this field generates an electrical signal having a waveform corresponding to the magnetic flux density of the alternating magnetic excitation field superimposed by peaks produced upon reversal of the magnetic state of the marker element. The position of these peaks, relative to the alternating magnetic excitation field, is determined, and if different from half the period duration of the alternating magnetic excitation field by less than a predetermined value, a first state of the marker element may be detected. Otherwise, it may be determined that, either, no marker element is present in the alternating magnetic excitation field, or that the marker element is in a second state different from the first state.

11 Claims, 6 Drawing Sheets

DEVICE AND A METHOD FOR DETECTING A MAGNETIZABLE MARKER ELEMENT

BACKGROUND OF THE INVENTION

1. Field of the Invention

The invention relates to a device and a method for detecting a magnetizable marker element, and specifically a magnetizable marker element of the type attached to an object for protection against unauthorized removal of the object. In particular, it is the purpose of the invention to allow the detection of the presence of a marker element with a known magnetic behavior or, in case of a marker element that may take two different kinds of magnetic behaviors, to allow the detection of the present state.

2. Description of the Prior Art

A great number of such systems, also called anti-theft devices, are known from prior art which are used to detect whether objects or articles have been removed without permission from a shop or a lending facility, such as a lending library for books, films, compact discs and the like. Generally, these systems are divided into two groups, namely systems in which responders respond to an electromagnetic interrogation field and include integrated electrical circuits, mostly oscillating circuits and their other corresponding circuitry, which are attached to the objects to be protected. Electric oscillations are caused in these responders through the interrogation field, the responders then transmitting signals which, upon detection, indicates that the responders are still attached to the object. The responders, mostly encapsulated in plastics tags or the like, have to be removed from the articles by the personnel so that no alarm is triggered. Examples of these systems that use radio frequencies are described in U.S. Pat. Nos. 3,838,409; 3,863,244; 3,961,322; 4,243,980; 4,281,321; 4,321,586; 4,642,640; and 5,051,727.

The second large group of systems relates to magnetizable marker elements that are magnetically reversed when passed through the interrogation or excitation field, which is an alternating magnetic field, whereby they influence the excitation field. Due to the hysteresis properties of the magnetizable marker elements, the magnetic flux density changes abruptly upon each magnetic reversal, which is detected by a receiving aerial or other receivers, possibly in the form of a conductor loop. The change in time of the magnet flux density in the receiver is thus composed of a change in time that is due to the change in the intensity of the magnetic excitation field, and of the abrupt change upon each magnetic reversal of the marker element. Examples of such systems are disclosed in the German Laid Open document 27 09 522 and U.S. Pat. Nos. 4,118,693; 4,153,183; 4,384,281; 4,527,152; 4,539,558; 4,622,542; 4,663,612; 4,686,154; 4,704,602; 4,791,412; and 4,888,579.

The systems using a magnetically reversible marker element include systems in which the marker element is removed from the article by the personnel so that no alarm is issued at the exit. However, systems are known in which the marker element is activatable and deactivatable, i.e., it may be sensitized or desensitized. Such systems are particularly employed in lending libraries where it is important to resensitize the magnetic element when the object is returned by the customer. The dual-status, activatable and deactivatable, marker element thus usually remains on the object. Such a surveillance system comprises a stationary surveillance unit for generating and detecting the excitation magnetic field at the exit of a shop (also referred to as "aisle"), as well as (desk) devices with which the marker element is activated (so-called resensitizers) or deactivated (so-called desensitizers) and with which the state (activated or deactivated) of the magnetic marker element may be checked (so-called verifiers).

A problem common to all known anti-theft systems is that they may trigger an alarm caused by an external interference influencing the magnetic interrogation and/or excitation field and not only when an object with an unremoved or not deactivated marker element is moved through the aisle. Erroneously triggered alarms are very inconvenient to the operator of the surveillance system since the customer will be suspected to have intended to take away the object concerned without permission.

A great number of methods for increasing the indifference to interference are implemented in the systems described in the above patent documents, according to which the output signal of the receiver device exposed to the interrogation field is processed and evaluated further in a certain manner. Systems are known, for example, which, by means of an amplitude detection, possibly with a previous filtering, determine whether the output signal from the receiver device has been caused by an interference or not (U.S. Pat. Nos. 4,118,693; 4,153,183; 4,704,602; and German Laid Open document 27 09 522). Further, methods are known in which correlation functions are calculated or certain harmonics of the received signal are determined, the amplitude values of which are evaluated and compared to preset values (U.S. Pat. Nos. 4,384,281; 4,527,152; 4,539,558; 4,622,542; 4,663,612; 4,791,412; and 4,888,579). Checking the received signal or certain harmonics of the received signal for exceeding predetermined upper or lower threshold values is a rather unreliable method that does not allow for sufficiently reliable results. Correlation function methods are generally rather unreliable, yet they require a comparatively complex circuit design with complicated signal processing.

SUMMARY OF THE INVENTION

The invention refers to surveillance systems with magnetically reversible marker elements that, preferably, are activatable and deactivatable, and in particular to a verification device with which the state of the marker element attached to the article or the object may be detected and verified, for example by personnel.

It is the object of the invention to provide such a device which has a high degree of indifference to interferences while being of simple circuit design.

According to the invention, the object is solved by a device comprising a transmitter, a receiver, a signal processor which includes a band pass filter, a comparator and an indicator. The transmitter produces a magnetic excitation field which periodically alternates at a fundamental frequency. The marker element produces changes in the flux density of the field which are received by the receiver. The band pass filter filters those signal portions having frequencies outside the frequency range predetermined by the band pass filter, and thus eliminates the fundamental frequency component. The filtered output signal thus has a superimposition of signals, the frequencies of which are integral multiples of the frequency of the excitation field, as far as these integral multiples lie within the frequency range of the filter.

With a typical frequency of the excitation field of 1 kHz (equal to the frequency of the output or carrier signal of the receiver), a filtering of the harmonics of the carrier signal should be effected in a frequency range between, for example, 10 to 20 kHz or 50 to 60 kHz, i.e., within a frequency range that differs at least by one order of magnitude (decimal power) from the carrier signal frequency.

The thus filtered output signal is supplied to the comparator that also receives a signal corresponding to the fundamental frequency of the excitation field.

The comparator compares the time interval between two successive maximum signal values of different polarities of the filtered output signal to half the period duration of the excitation field and generates a first output signal when the time interval is within respective predetermined tolerance values above or below the value for half the period duration of the excitation field. The indicator generates a first indication signal upon receipt of a first output signal.

Preferably, the comparator may also generate a second output signal if the comparison indicates that the magnitude of a time interval between two successive maximum signal values of opposite polarities are outside the tolerance ranges, such that the indicator then also produces a second indication signal. This latter signal is indicative that a different magnetic state of the marker element has been detected.

Optionally, a phase superimposition check is carried out for both signals in the comparator by comparing the value for half the period duration of the excitation signal with the magnitude of a time interval between two successive maximum signal values of different polarity of the filtered output signal. Using this comparison and its result, it may be determined whether a magnetically reversible marker element is present or whether an activable or deactivatable marker element is still in the activated, i.e., sensitized state or not.

The signal evaluation performed by the device according to the invention is primarily based on the following physical principle:

A magnetically reversible marker element possesses hysteresis properties, due to which the magnetic flux within the marker element changes more or less abruptly upon reversal of the magnetic state of the marker by the excitation field. Without any interference by other magnetized objects or materials, the switching point of the marker element is symmetrical, i.e., the positive switching point, i.e., the effective positive coercive force, $+H_c$ has the same absolute value as the negative switching point, i.e., the effective negative coercive force, $-H_c$. Upon a sinusoidal change in the excitation field, the changes in the magnetic flux density caused by magnetic reversal of the marker element are always symmetrical to the zero point crossing of the change in time of the excitation magnetic field. Since the coercive force of the marker element is considerably smaller than the peak value of the magnetic field intensity of the excitation field, the change in magnetic flux density lies approximately at the zero crossing of the magnetic field intensity. Besides a change in the magnetic flux density, the receiver also detects a change of the magnetic flux density upon each magnetic reversal of the marker element. The change in the signal received of the receiver caused by the reversal of the magnetic state of the marker elements shows the same frequency as the alternating magnetic excitation field and is similarly symmetrical when the marker element is not disturbed by any other magnetic materials. Taking into account that the change in the magnetic flux density induces a voltage or current signal into the receiver, which typically comprises a coil, a conductor-loop or an aerial, the time interval between two successive maximum signal values of the filtered output signal, both having the same magnitude and a different polarity, is equal to half the period duration of the alternating magnetic excitation field. If the comparator thus detects that such an interval lies within a predetermined tolerance range of the value for half the period duration of the excitation field, the comparator issues a corresponding first output signal which, in an optical and/or acoustic indicator device, is converted to a first indication signal for indicating the presence of a marker element with the magnetic behavior described above.

Should there be no marker element attached to the object being checked, the filtered output signal (without any external interferences) is zero, since the output signal of the receiver is sinusoidal if the excitation field is also sinusoidal, and since, accordingly, the filtering of the harmonics effected in the band pass filter provides a zero signal. If the filtered output signal has successive maximum signal values with a time interval outside this tolerance range, this indicates an interference or a deactivated marker element.

The signal evaluation performed by the device of the present invention is rather simple since it is merely directed to the filtering of the harmonics of the receiver output signal and comparing the time interval between adjacent, opposite polarity pulses of the filtered output signal and one-half the period of the excitation field. According to the device of the invention, there is no comparison of an amplitude value and an amplitude threshold value or the like in order to determine whether, and, if so, which indication is to be issued. The amplitude of the electrical signal outputted by the receiver, in particular the magnitude of the peaks which, given a sinusoidal excitation field, are superimposed on the sinusoidal signal, are not included in the evaluation. Rather, the time interval of respective successive peaks caused by the presence of the magnetically reversible marker element is decisive. An external interference can cause an erroneous alarm only if the external interference occurs at the same frequency as the alternating magnetic excitation field, if it is in phase with the alternating magnetic excitation field and if, in the frequency range predetermined by the band pass filter, it generates the same harmonics having the same signal portions as a marker element. However, it is highly unlikely that these three conditions should be met at the same time so that the device of the present invention ensures a highly reliable protection against external interferences.

A high indifference to interferences is particularly desirable with verifier devices with which, as described above, personnel can check the state of an activatable or deactivatable marker element before handing out the object provided with such a marker element. It is intended to prevent the operative verifier device from responding to external influences and from issuing an alarm, although no object has been passed along the device.

If the device of the invention is implemented as a surveillance device at the exit of a shop, the first indication signal is the equivalent of an alarm signal meant to be an acoustic, clearly perceptible indication of an attempted unauthorized removal of an object. However, if the device of the present invention is designed for use as a checking or verifier to be used by the personnel, the first indication signal is to indicate that the marker element is in the sensitized condition so that the surveillance system at the exit of the shop will respond when an object provided with the marker element in the sensitized condition is passed therethrough, the object thereby being secured against theft.

In order to increase the reliability of the time comparison between two successive maximum signal values of different polarity of the filtered output signal and half the period duration of the alternating magnetic excitation field, an advantageous embodiment of the device of the present invention includes a signal converter within the signal processor. This signal converter generates a sequence of pulses, the interval between two successive pulses being equal to the interval between two successive maximum signal values of different polarities of the filtered output signal. Thereafter, the pulse time interval and the half duration of a period of the excitation field are compared in the comparator.

Preferably, the signal converter also includes a rectifier for rectifying the filtered output signal and a pulse signal generator arranged downstream of the rectifier. The latter generates pulses with a width equal to that of the respective time interval within which the rectified filtered output signal has an amplitude greater than a predetermined amplitude threshold value. Preferably, the pulse signal generator is a Schmitt trigger.

In order to even the rectified filtered output signal supplied to the pulse signal generator, the signal converter further preferably includes a series connection of a high pass filter and a low pass filter between the rectifier and the pulse signal generator. Such an evened signal can then be more reliably converted to single pulses in the pulse signal generator, the width of the pulses being equal to that of the time intervals for which the signal values of the filtered output signal are larger than the predetermined amplitude threshold value.

Preferably, the value for half the period duration is derived from the excitation oscillation signal for the alternating magnetic excitation field. The excitation oscillation signal is generated by a controller and is supplied to the transmitter by the same.

In order to reduce the comparing process in the comparator to a pulse width comparison of two pulse signal sequences that are in phase, the excitation oscillation signal is also converted to individual pulses in a further pulse signal generator provided therefor. The width of these pulses corresponds to the duration of the time intervals for which the absolute amplitude of the excitation oscillation signal is larger than a predetermined amplitude threshold value. Preferably, this pulse signal generator also is a Schmitt trigger.

After both the filtered output signal and the excitation oscillation signal have been converted to respective pulse sequences, a comparison between the time durations of successive pulses of the two respective sequences is performed in the comparator. The operation of the comparator can be advantageously simplified by submitting both pulse sequences to a respective frequency division so that pulse sequences with half the previous frequency are obtained. Now, only the widths of two pulses that are in phase must be compared. If the width of a pulse generated by processing the output signal of the receiver is equal to or, with consideration of a tolerance range, equals the width of a pulse generated by processing the excitation oscillation signal, the comparator supplies the first output signal for generating the first indication signal to the indicator device, thereby indicating that an object with a possibly not deactivated marker element has been moved past the verifier device.

As already mentioned above, the device of the present invention allows one to detect both the active and the deactive states of a marker element that is both activatable and deactivatable. Such a marker element typically has a first magnetically reversible material with a low coercive force and a second magnetically reversible material with a high coercive force, with the two magnetizable materials provided in the form of superposed material layers, the arrangement of layers being provided behind an article tag or in the form of strips. While the field intensity of the alternating magnetic excitation field assumes values that are larger than the coercive force of the first material, the coercive force of the second material surpasses the maximum field intensity of the excitation magnetic alternating field. The coercive force of the first material is smaller by about two orders of magnitude (decimal powers) than the maximum value of the field intensity of the alternating magnetic excitation field, whereas the coercive force of the second material is at least twice or three times the amplitude value of the alternating magnetic excitation field. Magnetizing and demagnetizing the second magnetic material may be effected by well known magnetizing and demagnetizing techniques. With the second material demagnetized, the marker element behaves in the alternating magnetic excitation field as described before. The excitation field is too weak to magnetize the second magnetizable material such that it could affect the magnetic reversal behavior of the first magnetizable material.

In contrast thereto, the external magnetic field generated by the second material when it is (pre) magnetized influences the magnetic reversal behavior of the first material, and causes a shift in the switching point of the first material, so that the positive and negative switching points are no longer symmetrical with respect to the zero point. Under the biasing influence of the magnetic field of the second material, the absolute value of the effective positive coercive force $+H_c$ has a greater (smaller) magnitude than the absolute value of the effective negative coercive force $-H_c$. The influence of the magnetic field of the magnetized second material can be as strong as to shift the switching point completely to positive (negative) magnetic field intensities, i.e., both effective coercive forces of different magnitudes have the same sign. Thus, the changes in the magnetic flux density detected by the receiver no longer coincide even approximately with the zero crossings of the field intensity of the alternating magnetic excitation field.

This state is detected in the comparator, because the time interval between two successive maximum signal values of different polarity of the filtered output signal is larger or smaller, respectively, than half the period duration of the alternating magnetic excitation field and is outside the respective tolerance ranges. In this case, the comparator issues a second signal that is converted by the indicator to a second indication signal different from the first one. While the first indication signal is to issue an alarm, depending on the implementation of the device of the present invention, the second indication signal is only a verification signal indicating that the marker element is deactivated or desensitized.

The device of the present invention is not only capable of qualitatively detecting any asymmetry between the respective successive positions and negative switching points of the marker element; further, it is also possible to make a statement on the degree of the asymmetry based on the relative duration between two maximum signal values. Thus, a far greater range of possible applications for the device of the present invention is obtained than just an application in the context of anti-theft systems.

Using the device of the present invention, it is possible to detect and to quantitatively check a variety of magnetizable elements with presettable magnetic properties. Examples for such elements are magnetically exchange-coupled dual-layer magnetic films with two different coercive forces, so-called Wiegand wires, magnetic films with exchangeable anisotropy and article tags for electronic anti-theft systems having two different possible magnetic states.

In order to augment the reliability with which the state of the magnetizable marker element is indicated, another advantageous embodiment of the present invention provides that the indicator does not generate the corresponding alarm signal immediately upon receiving a single first or second output signal from the comparator. It is advantageous, if first a plurality of time intervals between two successive maximum signal values of different polarity of the filtered output signal are compared, respectively, to half the period duration of the alternating magnetic excitation field so that, if the plurality of comparisons result in the generation of only first or only second output signals, the corresponding indication signal may then be issued. The number of comparator output signals that the indicator has to receive before generating the corresponding indication signal may be different depending on the kind of output signal (first or second).

As mentioned before, with activatable and deactivatable marker elements, the verifier device is always used in combination with a resensitizer or a desensitizer. Before handing out an article or an object to a customer, the object or the article with the marker element thereon is passed along the desensitizer by authorized personnel in order to desensitize the marker element. The desensitizer generates a strong magnetic field in which the second material of the marker element is magnetized, preferably to saturation. In order to be able to check whether the marker element is actually desensitized, the object is then passed along the verifier in which the operations described before take place. It is not necessary to obtain a maximum reliable indication of whether or not the marker element is deactivated since, even if the marker element were still active despite a contrary indication by the verifier device, this would only result in alarm being triggered at the shop exit. Thus, the comparator must only output one or a few successive second output signals before the indicator outputs the second indication signal for indicating the deactivated state of the marker element.

In order to activate the marker elements, the objects are passed along the resensitizer which provides an alternating magnetic field of gradually decreasing intensity for demagnetizing the second material of the marker element. Thereafter, the marker element is sensitized. To check this state, the object with the marker element is passed along the verifier. It is desirable to indicate as reliably as possible whether the marker element is activated so as to protect the object against unallowed removal. Accordingly several first output signals are desirably generated by the comparator before the corresponding indication signal is produced, than are necessary for merely detecting the deactivated state.

In an optional embodiment of the device of the present invention, the phase positions between the zero crossings of the excitation field and the maximum positive or negative signal values of the signal generated by band pass filtering the harmonics of the output signal of the receiver may also be compared. If the filtered output signal is in phase with the alternating magnetic excitation field and the excitation oscillation signal and the time interval between two successive maximum signal values of different polarity of the filtered output signal does not deviate from the value of half the period duration of the excitation oscillation signal by a predetermined tolerance range, no output signal indicating the presence of the marker element or the active state of the marker element is issued. In such an embodiment, because three preconditions have to be met simultaneously, namely that the signals must be in phase, certain harmonics of the carrier signal frequencies must be present to pass through the band pass filter and the duration between adjacent pulses of the filtered signal portions must correspond to one-half the period of the excitation field, it is rather unlikely that an external interference could cause an erroneous triggering of the alarm or an erroneous indication by the device of the present invention.

DETAILED DESCRIPTION

Figure 1:
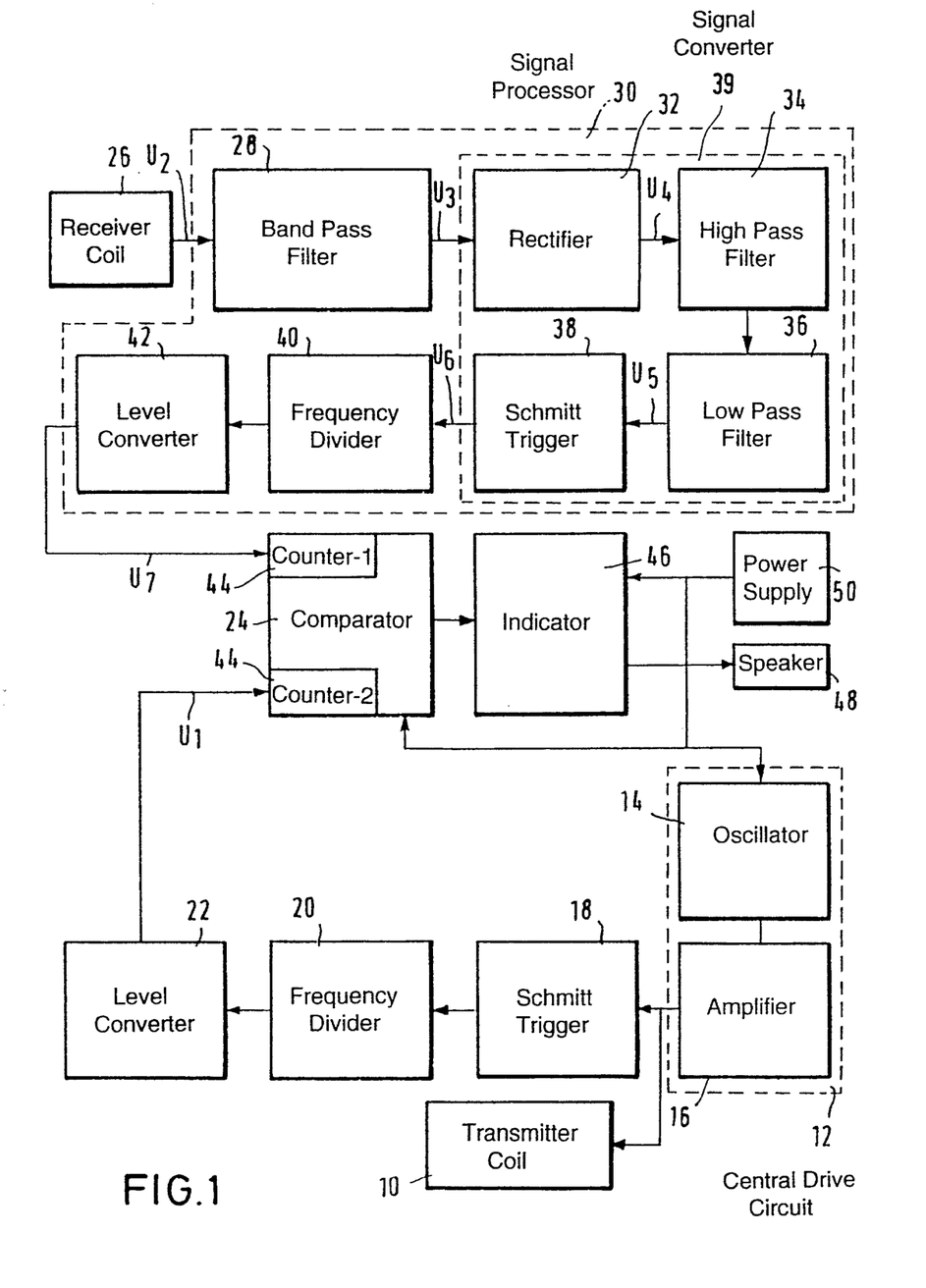
FIG. 1 shows a block diagram of the means for detecting the state of a magnetizable marker element.

Referring now to FIG. 1, the marker detection device of the present invention will be described using the example of a verifier. The verifier, the structure of which will not be described in detail herein, has a transmitter in the form of a transmitter coil 10 operated by a sinusoidal excitation oscillation signal. This excitation oscillation signal is generated in a control/drive circuit 12 comprising an oscillator 14 and an amplifier 16. The control/drive circuit 12 outputs an excitation oscillation signal with a frequency of 1 kHz, for example. Besides to the transmitter coil 10, the excitation oscillation signal is supplied to a pulse signal generator in the form of a Schmitt trigger circuit 18, the output signal of which is converted in a frequency divider circuit 20 such that the pulse-shaped output signal of the frequency divider circuit 20 has half the frequency of the pulse-shaped output signal of the Schmitt trigger circuit 18. After conversion, the output signal of the frequency divider circuit 20 is supplied to a level converter 22 and thence to comparator 24 as a signal $U_1$.

A receiver, in the form of a receiver coil 26, is provided within the alternating magnetic excitation field generated by the transmitter coil 10. The output of the receiver coil 26 provides a time-dependent output voltage signal $U_2$ in response to signals induced in the receiver coil 26 by the alternating magnetic excitation field. The output signal $U_2$ of the receiver coil 26, the primary frequency component of which is equal to the fundamental frequency of the excitation oscillation signal, i.e., 1 kHz, is supplied to a signal processor 30, a first component of which is a band pass filter circuit 28. The frequency range predetermined by the band pass filter circuit 28 extends, for example, from a frequency of 10 kHz to a frequency of 20 kHz so that the filtered output signal $U_3$ comprises a superimposition of those signal portions of the harmonics having frequencies that are a multiple of the fundamental carrier frequency of the induced voltage signal $U_2$ from the receiver coil 26. The band pass filter circuits used may be, for example, Tschebyscheff filters of fourth order.

The filtered output signal $U_3$ of the band pass filter circuit 28 is supplied to a rectifier 32 which is the first stage of a signal converter 39 of the signal processor. The filtered output signal $U_3$ is rectified by the rectifier 32 and is then supplied as a voltage signal $U_4$ to a high pass filter 34 and then to a low pass filter 36, which two filters are also components of the signal converter 39. The output signal $U_5$ from the low pass filter 36 is supplied to a pulse signal generator in the form of a Schmitt trigger circuit 38. The signal converter 39, comprising the rectifier 32, the two filters 34, 36 and the Schmitt trigger circuit 38 thus convert the output signal from the receiver coil 26 into pulse signals.

The output signal $U_6$ of the Schmitt trigger circuit 38 is supplied to a frequency divider circuit 40 which converts the pulse-shaped output signal $U_6$ to a pulse-shaped signal of half the frequency of the signal $U_6$. The level of the frequency-divided output signal of the Schmitt trigger circuit 38 is converted in a level converter circuit 42 arranged downstream of the frequency divider circuit 40. The output signal $U_7$ of the level converter circuit 42, which, at the same time, is the output signal of the signal processor 30, is supplied to the comparator 24 along with the output signal $U_1$ produced by way of signal processing of the excitation signal for the transmitter coil 10.

The comparator 24 comprises two clocked counters 44 that detect the pulse widths of the two signals supplied to the comparator circuit 24. Thereafter, these two pulse widths are compared in the comparator circuit 24. Depending on the result of the comparison, the comparator circuit 24 generates a first or a second output signal which is supplied to an indicator circuit 46. In the indicator circuit 46, the output signal of the comparator circuit 24 is converted to a first or a second indication signal which is supplied to a loudspeaker 48. All units of the device represented by a block diagram in FIG. 1 are connected to a power supply 50.

Figure 2:
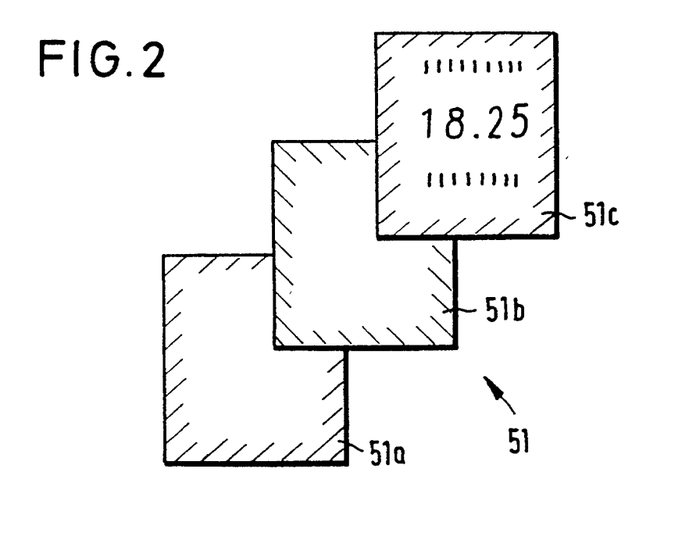
FIG. 2 illustrates the structure of a marker element.

With reference to the exploded view according to FIG. 2, an example for a marker element will be explained. The marker element 51 is integrally formed with a price tag and comprises two layers 51a, 51b of different magnetizable materials. The first material layer 51a, consisting of a magnetically soft first material, e.g., permalloy, has a coercive force that is smaller than the field intensity of the excitation field. The second material layer 51b of the marker element 51 consists of a second material, e.g., iron oxide, having a coercive force substantially larger than the peak value of the intensity of the alternating magnetic excitation field. A third material layer 51c of the marker element consists of paper or another printable material which serves to display information such as the sales price or other data primarily important for stock taking, for example certain codes. All layers 51a, 51b, 51c are directly superposed, thus forming the sandwich-like marker element 51. In an active marker element 51, the second material layer 51b is demagnetized, whereas the second material layer 51b is magnetized to saturation when the marker element 51 is deactivated. The marker element is activated or deactivated by a so-called desensitizer or resensitizer. The object provided with the marker element 51 is moved past the resensitizer or the desensitizer in order to sensitize the marker element 51, i.e., to bring about the active state, or in order to desensitize a sensitized marker element 51, i.e., to bring about the deactivated state.

Referring now to the diagrams of FIGS. 3 to 30, the operation of the device for recognizing the state of a magnetizable marker element will be described. The diagrams of FIGS. 3 to 16 illustrate the waveforms of the voltage signals $U_1$–$U_8$, marked in FIG. 1, for the case that an activated marker element is within the alternating magnetic excitation field generated by the transmitter coil 10. In contrast thereto, FIGS. 17 to 30 illustrate the waveforms of the voltage signals $U_1$–$U_8$ for the case that a deactivated marker element is within the alternating magnetic excitation field.

Figure 3:
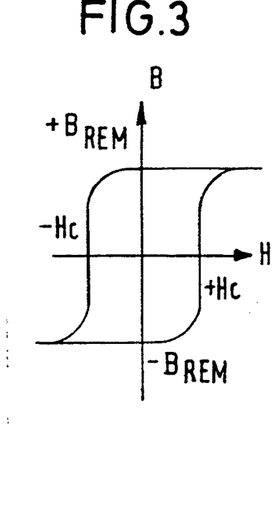
FIGS. 3 to 9 are graphs and signal paths for explaining the effects of an activated marker element in an alternating magnetic excitation field when in the first magnetization state.
Figure 4:
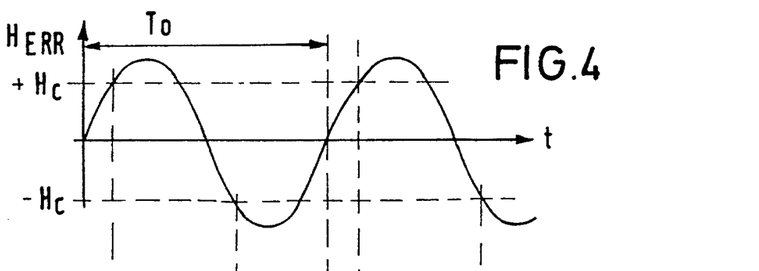
Figure 5:
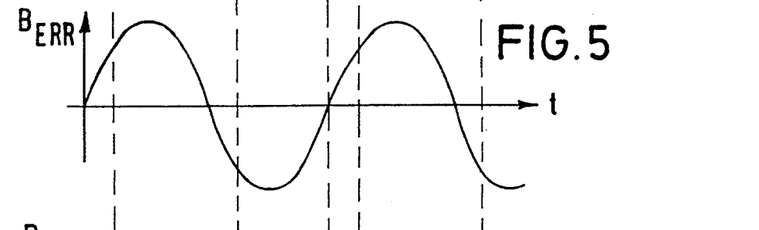
Figure 6:
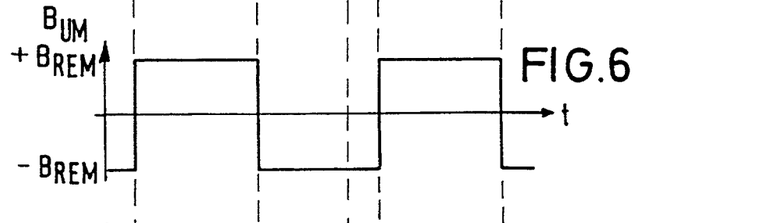
Figure 7:
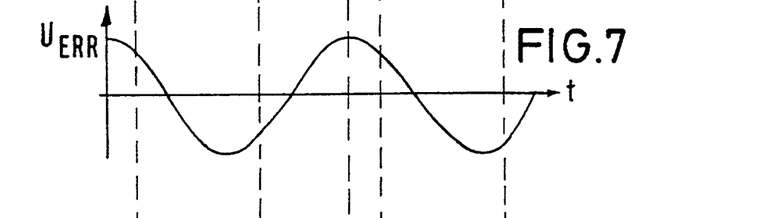
Figure 8:
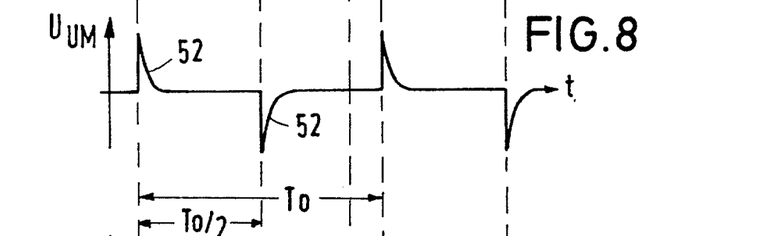
Figure 9:
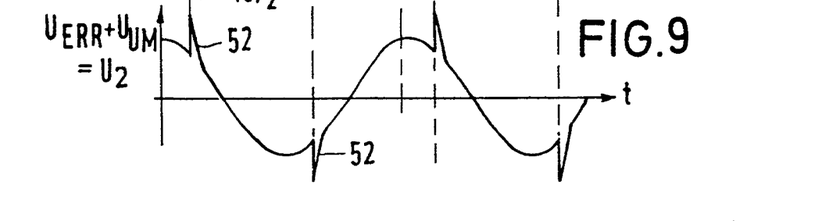
Figure 10:
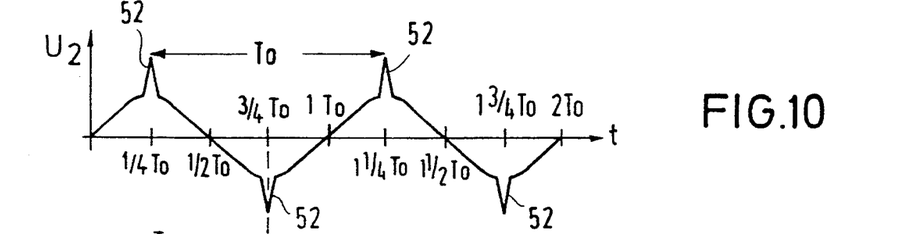
FIGS. 10 to 16 illustrate signal paths at the points marked in FIG. 1 for an activated marker element.

Irrespective of whether the second material layer is magnetized or whether it is demagnetized, the magnetically soft member of the marker element 51 (i.e., its first layer 51a) is magnetically reversed upon each reversal of the alternating magnetic excitation field. FIG. 3 illustrates the switching point of the magnetizable soft layer 51a in the case, where the second magnetically member of the marker element 51 (i.e., its second layer 51b) is demagnetized. Thus, FIG. 3 shows the switching point that describes the magnetic properties of the marker element 51 in the active state. $+H_c$, $-H^c$, $+B_{REM}$, $-B_{REM}$ indicate the positive and the negative coercive forces and the positive and negative remanence. The switching point is symmetric to the zero point. The waveform of the sinusoidal excitation magnetic field intensity $H_{ERR}$ is illustrated in FIG. 4. As illustrated in FIG. 5, the magnetic flux density $B_{ERR}$ also changes sinusoidally due to the change in the excitation magnetic field intensity $H_{ERR}$. Superimposed on this change in magnetic flux density is the magnetic flux density $B_{UM}$ resulting from the magnetic reversal of the magnetically soft, first material layer of the marker. Its waveform is shown in FIG. 6. As soon as the excitation magnetic field intensity $H_{Err}$ has reached and exceeded the positive coercive force $+H_c$ "from below", the magnetic flux density of the first material layer 51a is reversed from $-B_{REM}$ to $+B_{REM}$. As soon as the excitation magnetic field intensity $H_{ERR}$ has reached and exceeded the negative coercive force $-H_c$ "from above" the magnetic flux density of the first material layer 51a is reversed from $+B_{REM}$ to $-B_{REM}$. Since the switching point is symmetrical ($|-H_c| = |+H_c|$), the time periods for which the magnetic flux density $B_{UM}$ assumes the values $-B_{REM}$ or $+B_{REM}$ are of equal duration and ideally correspond to $T_o/2$, where $T_o$ is the period duration of the alternating magnetic excitation field (see FIG. 4). The voltage signal (FIG. 9) induced in the receiver coil 26 is composed of a first signal portion $U_{ERR}$ (FIG. 7), caused by the change in the excitation magnetic flux density, and a second signal portion $U_{UM}$ (FIG. 8) caused by the magnetic reversal of the first material layer 51a. Since the induced voltage is proportional to the change in the magnetic flux density, the first signal portion $H_{ERR}$ is sinusoidal, yet phase-shifted by 90° relative to the alternating magnetic excitation field, while the second signal portion $U_{UM}$ is (ideally) composed of sharp peaks 52 of different alternating polarity occurring at the points of magnetic reversal of the first material layer 51a. Since the switching point of FIG. 3 is symmetric about the zero point, i.e., the effective positive and the negative coercive forces are equal in magnitude, the interval between successive sharp peaks 52 is $T_o/2$.

Since the coercive force of the low-retentivity first material is rather small, in particular when compared to the maximum value of the intensity of the excitation magnetic field, the magnetic reversal occurs quite rapidly, approximately at each zero crossing of the excitation magnetic field intensity, which results in the sharp peaks 52 occurring near the broader peaks of the output signal $U_2$ of the receiver coil 26 (which, if no marker element is present, is induced in sinusoidal shape). Thus, in an activated marker element (the second material layer is not magnetized to saturation), the induced output signal $U_2$ of the receiver coil 26 takes the signal waveform illustrated in FIG. 10. The output signal consists of a base sine wave with the frequency of and the period duration $T_o$ that are both equal to the excitation oscillation signal (not illustrated), this sine signal being overlaid by peaks 52 caused by the magnetic reversal of the first material. As regards the generation of the signal, FIG. 10 thus corresponds to FIG. 9 with the approximation that the coercive forces have been set at approximately zero compared to the amplitude value of the alternating magnetic excitation field.

Figure 11:
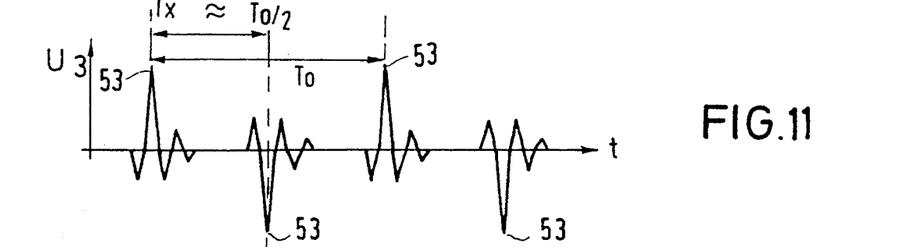
Figure 12:
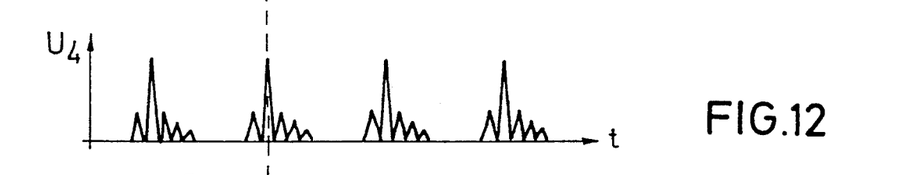
Figure 13:
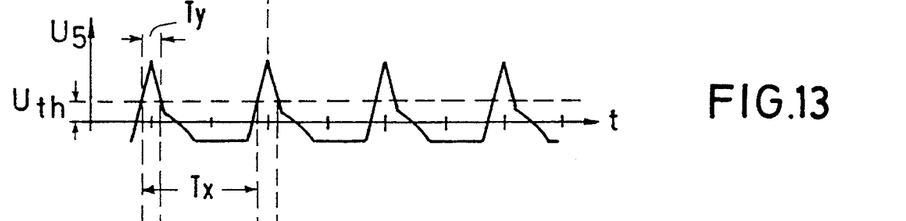

After the induced voltage signal $U_2$ has been filtered in the band pass filter circuit 28, the voltage signal $U_3$ is obtained, the waveform of which is illustrated in FIG. 11. This output signal primarily comprises such harmonics of the carrier frequency as are within the frequency range predetermined by the band pass filter circuit 28, and has successive maximum signal values 53 of alternating polarity, the time interval $T_x$ between two successive signal values 53 of different polarity being approximately $T_o/2$. After this voltage signal $U_3$ has been rectified in the rectifier circuit 32, the voltage signal $U_4$ is obtained, the waveform of which is represented in FIG. 12. By successively high pass filtering and low pass filtering the rectified voltage signal $U_4$ in the filters 34 and 36, the voltage signal $U_5$ is generated, the waveform of which is illustrated by FIG. 13. FIG. 13 also shows an amplitude threshold value $U_{th}$ with which the time varying signal $U_5$ is compared in the Schmitt trigger circuit 38 so that the output signal of the Schmitt trigger circuit 38 assumes a value other than zero only for the time intervals $T_y$ in which the voltage signal $U_5$ is greater the threshold value $U_{th}$.

Figure 14:
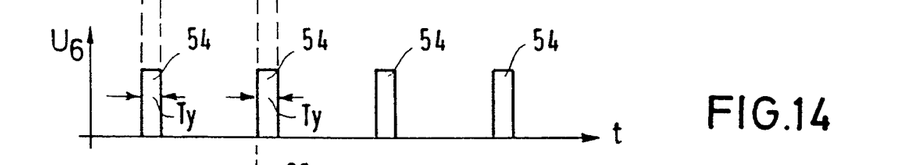
Figure 15:
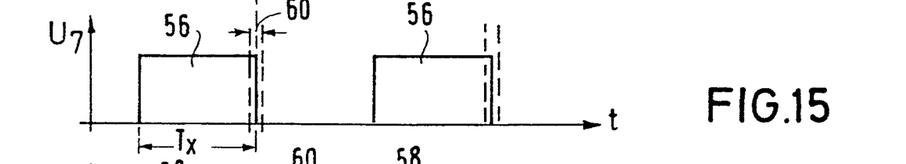

The output signal $U_6$ of the Schmitt trigger circuit 38 is illustrated in FIG. 14 and consists of a sequence of pulses 54 with the width $T_y$. Thus, the signal $U_6$ is a signal with a frequency that is equal to twice the frequency of the excitation oscillation signal, in which the pulses 54 are approximately in phase with the zero crossings of the excitation oscillation signal. After this output signal has been frequency-divided in the frequency divider circuit 40 and after the level has been converted in the level converter circuit 42, the pulse signal $U_7$ is obtained, the waveform of which is illustrated in FIG. 15 and which consists of a sequence of pulses 56 with the width $T_x$. The frequency of the pulse signal $U_6$ is equal to the frequency with which the first material layer of the marker element is magnetically reversed in the alternating magnetic excitation field.

Figure 16:
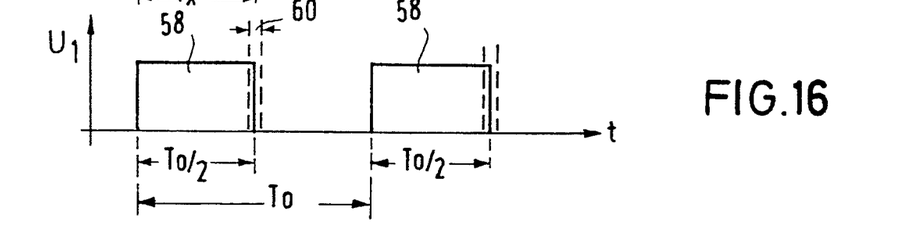

As described with reference to FIG. 1, the excitation oscillation signal is also subjected to signal processing by the Schmitt trigger circuit 18, the frequency divider circuit 20 and the level converter circuit 22, which results in the voltage signal $U_1$ with the waveform shown in FIG. 16 being obtained as the output signal of the level converter circuit 22. Also this signal $U_1$ is a sequence of pulses 58, the width of which is equal to half the period duration $T_o/2$ of the excitation oscillation signal (not illustrated). In the comparator circuit 24, the pulse widths $T_x$ and $T_o/2$ of two cophasal pulses 56, 58 of the signals $U_7$ and $U_1$ are compared. With the second material of the marker element demagnetized, the pulse width $T_x$ of a pulse 56 of the signal $U_7$ is equal to the pulse width $T_o/2$ of a pulse 58 of the voltage $U_1$ and, thus, is equal to half the period duration of the alternating magnetic excitation field, or the width $T_x$ of the pulse 56 lies within a predetermined tolerance range 60, indicated by broken lines in FIGS. 15 and 16. In this case, the comparator circuit 24 generates a first output signal for each pulse width comparison, which is supplied to the indicator circuit 46. Upon having received a predetermined number of successive first output signals, the indicator circuit 46 issues a first indication signal to the loudspeaker 48, thereby indicating an active marker element.

Figure 17:
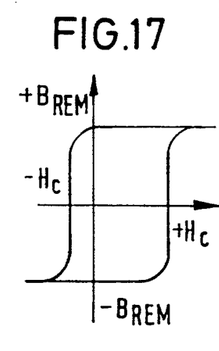
FIGS. 17 to 23 show graphs and signal paths for explaining the effects of a deactivated marker element when in the second magnetization state.
Figure 18:
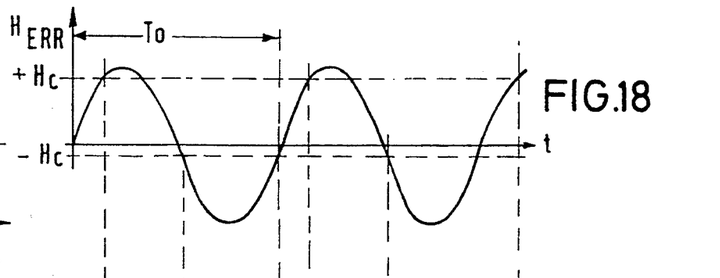
Figure 19:
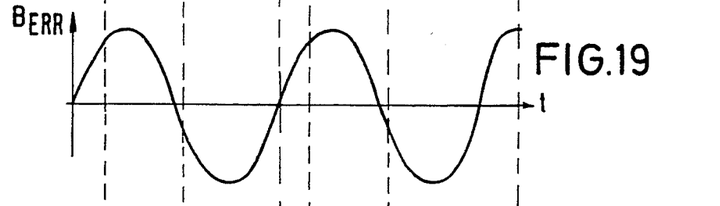
Figure 20:
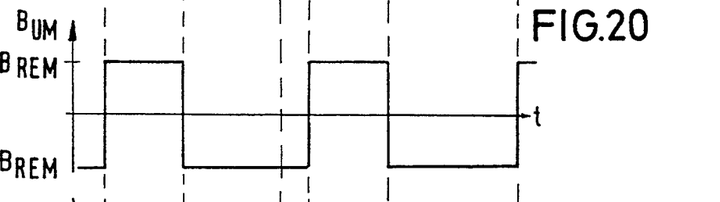
Figure 21:
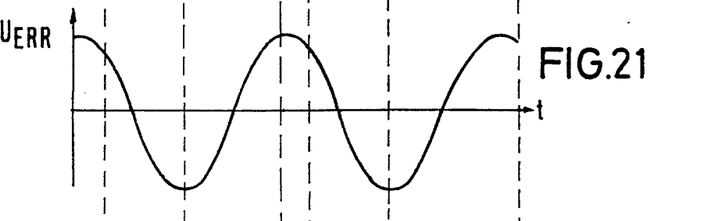
Figure 22:
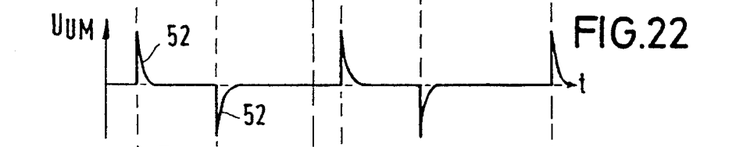
Figure 23:
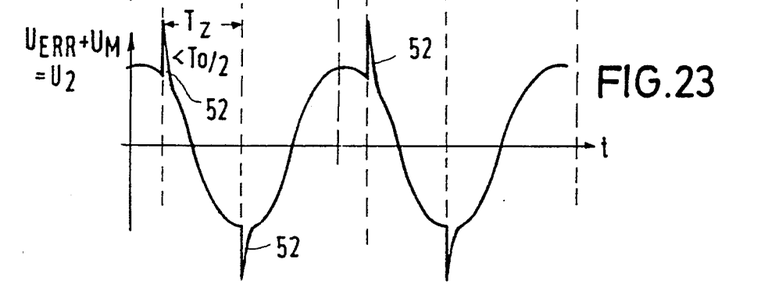

The following is a description of the conditions in the case of a deactivated marker element characterized by a second material layer magnetized to saturation. Under the influence of the second material of the marker element, which is preferably magnetized to saturation, the magnetic switching point of the first material is shifted. For example, the hysteresis graph of FIG. 17 is obtained, where it is seen that the positive and negative switching points are no longer symmetrical about the zero point; i.e., and that the effective positive and the negative coercive forces are no longer of the same absolute magnitude. With an alternating magnetic excitation field $H_{ERR}$ having a waveform as illustrated in FIG. 18, a waveform for the magnetic flux density $B_{ERR}$ as shown in FIG. 19 is obtained. These two waveforms correspond to those depicted in FIGS. 4 and 5. For the additional magnetic flux density $B_{UM}$ caused by the magnetic reversal of the first material layer, the waveform of FIG. 20 is obtained. Because of the non-symmetrical switching point ($|-H_c| \neq |+H_c|$), the time periods for which the additional magnetic flux density BUM assumes the value $+B_{REM}$ or $-B_{REM}$, are of different duration and, in particular, different from $T_o/2$. Thus, the successive peaks 52 of the voltage signal $U_{UM}$ (FIG. 22), induced due to the magnetic reversal of the first material layer, have different intervals therebetween. The waveform of the output signal of the receiver coil 26 is shown in FIG. 23.

Figure 24:
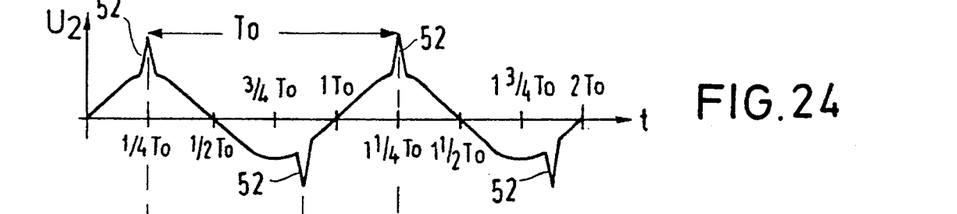
FIGS. 24 to 30 illustrate signal paths at the points marked in FIG. 1 for a deactivated marker element.
Figure 25:
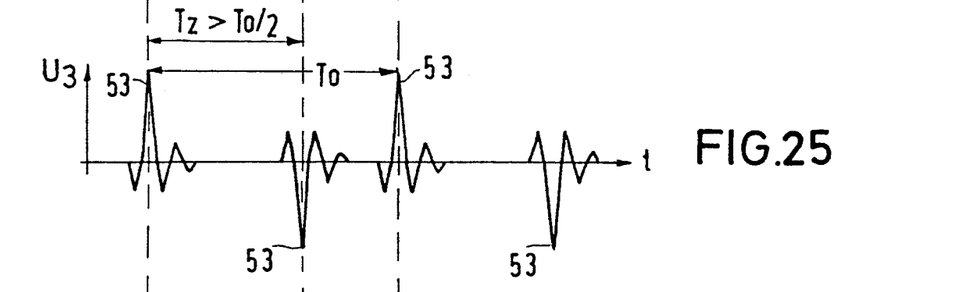
Figure 26:
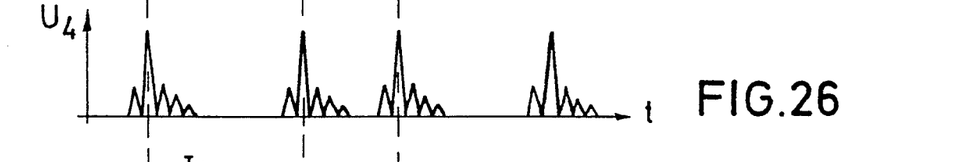
Figure 27:
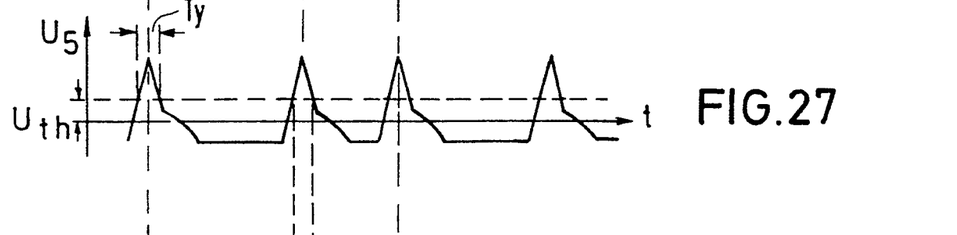
Figure 28:
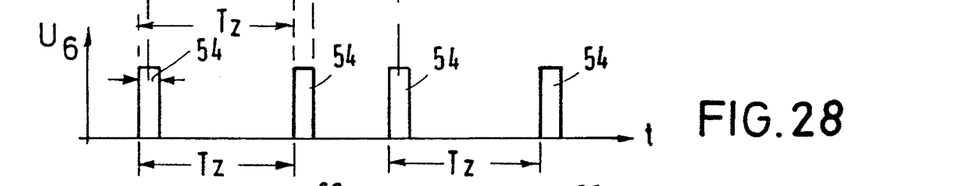
Figures 29, 30:
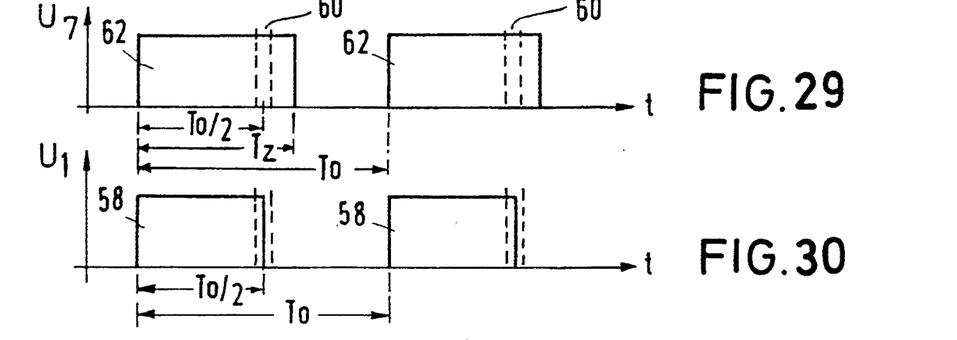

The signal processing of an induced voltage signal $U_2$ with a deactivated marker element being present in the alternating magnetic excitation field, is generally the same as that described above with respect to an activated marker. Since, in this case, however, the waveform of the induced voltage signal $U_2$ differs from that given when an activated marker element is present, the waveforms of the voltage signals $U_2$ to $U_7$ are different. Depending on the direction and the intensity of the pre-magnetization of the second material layer, the peaks 52 of the induced voltage signal $U_2$ are to the left or the right of the positive or the negative peak values. An assumed waveform of the signal 52 is shown in FIG. 24, wherein the positive peaks approximately coincide with the positive maximum values of the sinusoidal portion of the voltage signal $U_2$, whereas the negative peaks 52 lag in phase behind the negative maximum values. The signal path of FIG. 24 has been obtained as explained with reference to FIGS. 17 to 23. The pre-magnetization of the second material layer of the marker element thus biases the switching point of the first material layer towards positive magnetic field intensities. The resultant effective switching point, or negative coercive force $-H_c$, occurs approximately at the magnetic field intensity $H=0$, whereas the effective positive switching point, i.e., positive coercive force, $+H_c$ differs "considerably" from $H=0$ (see FIGS. 17 and 18). The interval $T_x$ between a positive peak 52 and a successive negative peak 52 is therefore larger than half the period duration $T_o/2$ of the alternating magnetic excitation field and, thus, is larger than the interval between the negative peak 52 and the next positive peak 52 (cf., FIG. 9), since two adjacent positive peaks 52 have the time interval $T_o$ between them. Thus, the pulses 54 of the voltage signal $U_6$ at the output of the Schmitt trigger circuit 38 also have mutually different intervals. Consequently, the successive frequency division in the frequency divider circuit 40 generates a pulse signal with pulses 62 having a width $T_z$ equal to the interval between a positive peak and the next negative peak of the induced voltage signal $U_2$ of the receiver coil 26 if the first pulse 54 of the voltage signal $U_6$ which is supplied to the frequency divider circuit 40, corresponds to a positive peak 52 of the voltage signal $U_2$. The width $T_z$ of the pulses 62 of the voltage signal $U_7$ is greater than the width $T_o/2$ of the pulses 58 of the pulse-shaped voltage signal $U_1$ derived from the excitation oscillation signal, even with consideration to the tolerance range 60. The comparator circuit 24 sends a second output signal indicative of this state to the indicator circuit 46, which, upon having received a predetermined number of such second output signals, supplies a second indication signal to the loudspeaker 48 for indicating the inactive state of the marker element.

In order to distinguish an active marker element from an inactive marker element, advantage is taken of the fact that the voltage peaks of the induced output signal of the receiver coil, caused by the magnetic reversal of the first material layer, have the same interval between each other, if the marker element is active, while they have unequal intervals between them, if the marker element is inactive. The height of the voltage peaks are of no importance in the evaluation. The amplitudes of the output signals of the receiver coil in case of a present or a non-present marker element or in case of an active or deactive marker element can be different. Accordingly, the values of the voltage peaks 52 of the signals shown in the FIGS. 10 and 24 normally are different.

An erroneous detection of an external interference signal as having been generated by the marker element requires, first, that the interference signal must be in a certain phase position relative to the excitation oscillation signal; second, it must have a carrier frequency that is equal to the frequency of the excitation oscillation signal; and, third, it must have harmonics within the frequency range predetermined by the frequency divider circuit 40 which correspond to those the induced output signal $U_2$ of the receiver coil 26 shows when a (active or inactive) marker element is present. Although the concept of the described device is simple with respect to the signal processing, it provides an extreme indifference to external interference so that the indication, whether a marker element is active or inactive, is highly reliable.

I claim:

1. A device for detecting a magnetizable marker element, adapted to be attached to an object to be protected against unauthorized removal, comprising:
    (a) a transmitter for generating a periodically alternating magnetic excitation field for reversing the magnetic state of the marker element;
    (b) a receiver arranged in said alternating magnetic excitation field for generating an electrical output signal corresponding to a signal received upon a said magnetic state reversal;
    (c) a signal processing means including a band pass filter for filtering said output signal of said receiver, the resultant filtered output signal having a superimposition of signal components, the frequencies of which are integral multiples of the fundamental frequency of the excitation field;
    (d) means for comparing the time interval between two successive maximum signal values of different polarities of the filtered output signal to a predetermined tolerance range associated with half the period duration of the excitation field, and for generating a first output signal when the time interval is within said predetermined tolerance range; and
    (e) an indicator generating a first indication signal upon receiving a first output signal from said comparing means.

2. The device of claim 1, wherein said signal processing means further includes a signal converter arranged downstream of said band pass filter for converting said filtered output signal to a sequence of pulses, the time interval between two successive pulses being equal to the time interval between two successive maximum signal values of different polarity of the filtered output signal, and said comparing means compares said pulse time interval to half the period duration.

3. The device of claim 2, wherein said signal converter comprises means for producing a rectified filtered output signal, and a first pulse signal generator arranged downstream of said rectifying means adapted to generate pulses having a width that is equal to the time intervals in which said rectified filtered output signal is greater than a respective threshold value.

4. The device of claim 3, wherein said signal converter further comprises a high pass filter in series with a low pass filter connected between said rectifying means and said pulse signal generator.

5. The device of claim 3, characterized in that said transmitter is controlled by a controller outputting an excitation oscillation signal to the transmitter for generating the alternating magnetic excitation field having a frequency predetermined by said excitation oscillation signal, and said half period duration of said alternating magnetic excitation field is derived from said excitation oscillation signal.

6. The device of claim 5, characterized in that a second pulse signal generator is provided to generate pulses having widths that are equal to the respective time intervals for which the absolute value of the excitation oscillation signal is greater than a threshold value.

7. The device of claim 6, characterized in that first and second frequency dividers are arranged upstream of said means for comparing, said first frequency divider receiving the output signal of said signal converter, said second frequency divider receiving the output signal of said second pulse signal generator, both frequency dividers generate output signal pulses of half the frequency of their respective input signals, and said means for comparing compares the pulse widths of both output signal pulses and generates the first output signal when an output signal of said first frequency divider is within a predetermined tolerance range associated with the width of the output signal of said second frequency divider.

8. The device of claim 1, characterized in that said marker element has a first magnetizable material with a low coercive force and a second magnetizable material with a great coercive force that is greater than the field intensity of the alternating magnetic excitation field.

9. The device of claim 1, characterized in that said means for comparing generates a second output signal when the magnitude of a time interval between two successive maximum signal values of different polarities of the filtered output signal lies on the limit of or outside said tolerance ranges, and said indicator generates a second indication signal upon receiving the second output signal from said means for comparing.

10. The device of claim 9, characterized in that said indicator generates said first or second indication signal only after said means for comparing has generated a plurality of first or second output signals.

11. A method for detecting a magnetizable marker element attached to an object to be secured against unauthorized removal, comprising the steps of:
(a) exposing said marker element to a periodically alternating magnetic excitation field such that the magnetic state of said marker element is periodically reversed;
(b) receiving a signal resulting from said magnetic state reversals of said marker element and converting it to a corresponding electrical signal, the electrical signal comprising the superimposition of a carrier signal corresponding to the periodic alternation of said alternating magnetic excitation field and a signal portion corresponding to said magnetic state reversals of said marker element;
(c) subjecting said electrical signal to a band pass filter, the obtained filtered signal comprising a superimposition of harmonics of the carrier signal of the electrical signal;
(d) defining a tolerance range associated with the value of half the period duration of the alternating magnetic excitation field;
(e) comparing the time interval between two maximum signal values of different polarities of said filtered signal to the defined tolerance range; and
(f) generating an output signal if the time interval is within the defined tolerance range.

* * * * *

UNITED STATES PATENT AND TRADEMARK OFFICE
CERTIFICATE OF CORRECTION

PATENT NO.   : 5,353,010
DATED        : October 4, 1994
INVENTOR(S)  : Juergen Sanetra It is certified that error appears in the above-indentified patent and that said Letters Patent is hereby corrected as shown below:

Col. 12, line 55      "BUM" should read --$B_{UM}$--

Signed and Sealed this

Twenty-fifth Day of April, 1995

Attest:

BRUCE LEHMAN

Attesting Officer      Commissioner of Patents and Trademarks